E. E. SLICK.
SECTIONAL WHEEL.
APPLICATION FILED NOV. 23, 1908.
932,064.
Patented Aug. 24, 1909.
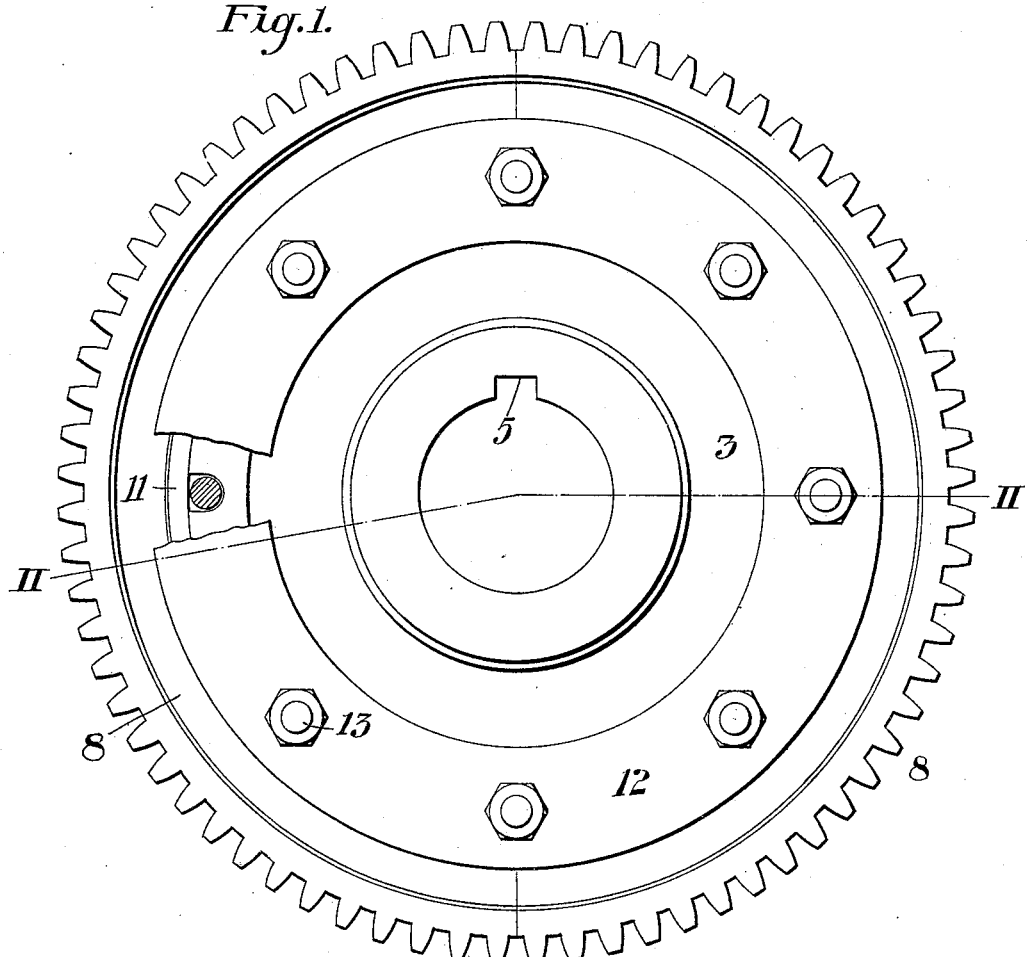
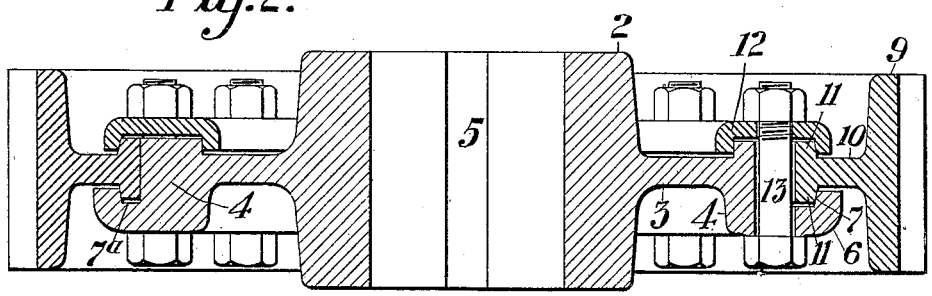
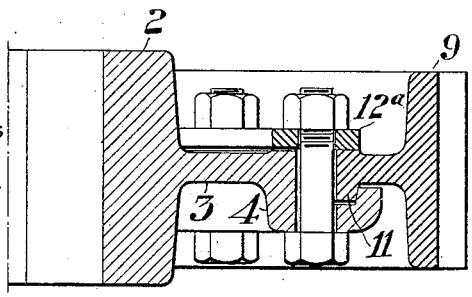
WITNESSES
R. A. Balderson
G. L. Wirters
INVENTOR
E. E. Slick,
by Bakewell, Byrnes & Parmelee,
his Attys.

UNITED STATES PATENT OFFICE.

EDWIN E. SLICK, OF PITTSBURG, PENNSYLVANIA.

SECTIONAL WHEEL.

932,064.　　　　　Specification of Letters Patent.　　Patented Aug. 24, 1909.

Application filed November 23, 1908. Serial No. 463,973.

*To all whom it may concern:*

Be it known that I, EDWIN E. SLICK, of Pittsburg, Allegheny county, Pennsylvania, have invented a new and useful Sectional Wheel, of which the following is a full, clear, and exact description, reference being had to the accompanying drawings, forming part of this specification, in which—

Figure 1 is a side elevation of a sectional gear wheel constructed and arranged in accordance with my invention; Fig. 2 is a transverse section on the line II—II of Fig. 1; Fig. 3 is a similar section of a portion of a wheel, showing a modified form of construction.

My invention relates to the construction of sectional wheels, and it more particularly relates to the construction of sectional metal spur gear wheels in which the toothed rim portion is made in segments which are detachably secured to the hub portion of the wheel. Heretofore such wheels have been split diametrally to enable their being secured on and removed from a shaft without disturbing the shaft in its bearings, the hub and rim portions of each half wheel being formed integral in such wheels.

The object of the invention is to provide a wheel having novel features of construction, in which a hub, adapted to be permanently secured in place on its shaft, is provided with a detachable rim portion which is arranged to be easily and quickly removed and replaced upon the hub, in changing or repairing broken or worn rim sections.

Another object of my invention is to provide improved means for securing the detachable rim portions of the wheel in place on its hub, by which the parts are accurately centered and are securely held in position in relation to each other.

A further object of my invention is to provide a sectional wheel having a construction in which the hub portion is adapted for use with segmental or detachable rims of varying diameters and widths of face and with rim portions of different cross sections.

In the drawings, 2 represents the solid hub of the wheel having an annular web portion 3 with a thickened marginal edge 4. The hub of the wheel is preferably cast in one piece, although it may be formed by rolling or forging and in one or more sections when desired. The bore of the wheel is provided with the key seat 5 in which a key is placed in securing the hub in position on its axle or shaft. Extending along one side of the thickened web portion 4 is a peripheral flange 6 having an annular groove in one of its faces, one side wall 7 of the groove being beveled or tapered.

The detachable rim 8 is preferably split and made in two segments of equal length and is provided with a face portion 9 which is connected by a web portion 10 with the oppositely extending flanges 11. The flanges 11 project on opposite sides of the inner edge of the web 10, and the faces of the flanges 11 are beveled at an angle corresponding to that of the inclined face 7 of the groove in the peripheral flange 6.

The rim portions 8 of the wheel are preferably formed from a rolled shape of the desired cross-section, which as shown is one suitable for making spur gears. The rolled shape is cut into suitable lengths and the cut shapes are then bent to the desired curvature. Preferably the bent rim portion is then machined to the exact size desired. The rim portion of the wheel may be formed by casting when desired, and the contour of the outer face of the rim portion of the wheels may be flanged or may be of varying widths.

After the hub portion of the wheel and the rim portions have been machined to size, they are assembled together, one of the flanges 11 on the rim portion being placed in the annular groove 7ª which is in the flange 6 on the thickened web 4 of the wheel. The rim portion 4 is then clamped in place, preferably by means of an annular clamping ring 12 having an annular groove in the face adjacent to the hub and rim. The side walls forming the groove contact with one of the flanges 11 on the rim of the wheel and with the adjacent flange portion of the thickened web 4 of the wheel, suitable bolts 13 being provided which extend through the bolt holes in the web 4 and ring 12, to hold the ring 12 in engagement with the hub and rim of the wheel.

In the modification shown by Fig. 3 the annular groove is omitted from the clamping ring 12ª, which bears on the side of the web and rim portion 11 to wedge and hold the rim in place on the hub of the wheel. Obviously cylindrical washers may be used with the bolts 13 to clamp the rim and hub together instead of the clamping rings 12 or 12ª. It will be noted that one face of the annular groove in the ring 12 is beveled to correspond with the angle of the contacting face on the flange 11 of the rim, and that when the bolts 13 are tightened the contacting faces of the parts are wedged together and are accurately centered in place.

In making sectional gear wheels, preferably the parts are machined and assembled together, after which the teeth are cut in the rim portion of the wheel.

The invention may be applied to the manufacture of wide-faced pulleys or wheels having a flanged tread portion; to making heavy fly wheels, and other similar articles having a hub and annular rim.

The advantages of my invention will be apparent to those skilled in the art. By the novel means employed for securing the rim and hub portions of the wheel in place the rim portions are accurately centered and held in alinement. The outer rim sections are prevented from moving sidewise in place and will always be in line with each other.

Modifications in the construction and arrangement of the parts may be made without departing from my invention. The parts may be held together by rivets instead of the bolts shown. Instead of making the hub portions solid as shown, they may be split, and the split hub sections may be secured together by means independent of the clamping rings 12, or not as is desired.

I claim:—

1. A sectional wheel comprising a flanged hub, a separable flanged rim and a grooved clamping ring, the side-walls of the clamping ring engaging with the flanges on the hub and rim, and means for holding the ring in engagement with the hub and rim; substantially as described.

2. A sectional wheel having a hub with an integral web portion, the marginal portion of the web being flanged, and having an annular groove in one face thereof, a sectional rim having an annular flange arranged to be seated in the annular groove, and a clamping ring having an annular recess in one face, the side-walls of the recess engaging with the flanges on the hub, and on the rim to hold the rim in frictional engagement therewith; substantially as described.

3. A sectional wheel having a hub with an integral web portion, the marginal edge of the web being flanged, and having an annular groove in one face thereof, a sectional rim having an annular flange arranged to be seated in the annular groove, and a clamping ring having an annular recess in one face, the side-walls of the recess engaging with the flanges on the hub and on the rim to wedge the rim into frictional engagement therewith; substantially as described.

In testimony whereof, I have hereunto set my hand.

EDWIN E. SLICK.

Witnesses:
 CHAS. E. DINKEY,
 H. M. CORWIN.